United States Patent
Koyama et al.

(10) Patent No.: US 8,611,958 B2
(45) Date of Patent: Dec. 17, 2013

(54) PORTABLE WIRELESS DEVICE

(75) Inventors: Tadashi Koyama, Kanagawa (JP); Kunihiko Watanabe, Kanagawa (JP); Katsuji Morishita, Kanagawa (JP); Shin Takahashi, Kanagawa (JP); Kenji Waku, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 1004 days.

(21) Appl. No.: 12/593,857

(22) PCT Filed: Mar. 28, 2008

(86) PCT No.: PCT/JP2008/056201
§ 371 (c)(1),
(2), (4) Date: Jan. 8, 2010

(87) PCT Pub. No.: WO2008/120757
PCT Pub. Date: Oct. 9, 2008

(65) Prior Publication Data
US 2010/0130273 A1    May 27, 2010

(30) Foreign Application Priority Data
Mar. 29, 2007  (JP) ................................ 2007-087495

(51) Int. Cl.
*H04M 1/00*  (2006.01)
(52) U.S. Cl.
USPC .................. 455/562.1; 455/575.7; 455/13.3; 455/19; 343/702; 343/722
(58) Field of Classification Search
USPC ............ 455/13.3, 19, 25, 63.4, 82, 83, 562.1, 455/575.7, 107
See application file for complete search history.

(56) References Cited

U.S. PATENT DOCUMENTS

| | | | |
|---|---|---|---|
| 6,958,730 B2 * | 10/2005 | Nagumo et al. | 343/702 |
| 2003/0169152 A1 * | 9/2003 | Charrat et al. | 340/10.1 |
| 2003/0232600 A1 * | 12/2003 | Montgomery et al. | 455/67.11 |
| 2004/0063902 A1 * | 4/2004 | Miranda | 530/324 |
| 2004/0113842 A1 * | 6/2004 | du Toit et al. | 343/700 MS |

(Continued)

FOREIGN PATENT DOCUMENTS

| | | |
|---|---|---|
| JP | 61087434 | 5/1986 |
| JP | S62-188507 A | 8/1987 |

(Continued)

OTHER PUBLICATIONS

Office Action dated Nov. 7, 2011, in related U.S. Appl. No. 12/443,456.

(Continued)

*Primary Examiner* — Lester Kincaid
*Assistant Examiner* — Mehmood B Khan
(74) *Attorney, Agent, or Firm* — Procopio, Cory, Hargreaves & Savitch LLP

(57) ABSTRACT

Provided is a portable wireless device having a plurality of antennas of different frequency bands. By positively using one antenna for improving gains of other antennas, the one antenna can be effectively used and the gains of other antennas can be improved. Patterns (A1, A2, A3, B1, B2 B3) for adding a band disturbing element (80) (high frequency blocking means), which is composed of beads and a parallel resonance circuit, are arranged at a prescribed position of a magnetic field antenna (50). The band disturbing element (80) may be composed of ferrite core or the like.

18 Claims, 13 Drawing Sheets

(56) References Cited

U.S. PATENT DOCUMENTS

| | | | |
|---|---|---|---|
| 2004/0135729 A1* | 7/2004 | Talvitie et al. | 343/702 |
| 2007/0063902 A1* | 3/2007 | Leisten | 343/702 |
| 2007/0298730 A1* | 12/2007 | Tandy | 455/90.3 |

FOREIGN PATENT DOCUMENTS

| | | |
|---|---|---|
| JP | H4-71368 | 11/1992 |
| JP | 05-145324 | 6/1993 |
| JP | H5-284060 | 10/1993 |
| JP | 3013672 U | 7/1995 |
| JP | H09-046259 A | 2/1997 |
| JP | 09-289483 | 11/1997 |
| JP | 2712991 | 2/1998 |
| JP | 2968716 | 11/1999 |
| JP | 2003-332840 | 11/2003 |
| JP | 2004-227046 | 8/2004 |
| JP | 2004-242306 A | 8/2004 |
| JP | 2004-312157 | 11/2004 |
| JP | 2005-323318 A | 11/2005 |
| JP | 2005-347958 | 12/2005 |
| JP | 2006-42111 | 2/2006 |
| JP | 2006-319477 A | 11/2006 |
| WO | WO 2006/059406 | 6/2006 |

OTHER PUBLICATIONS

Notice of Reasons for Rejection dated Jun. 14, 2011 issued for counterpart Japanese Application No. 2009-507540.

* cited by examiner

PORTABLE WIRELESS DEVICE

RELATED APPLICATION

This application is the United States national stage application of international application serial number PCT/JP2008/056201, filed 28 Mar. 2008, which claims priority to Japanese patent application no. 2007-087495, filed 29 Mar. 2007, each of which is incorporated herein by reference in its entirety.

FIELD OF THE INVENTION

The present invention relates to a portable wireless device for communicating with other terminals.

BACKGROUND

Recently, for improved functionality, portable wireless devices provided with a communicating means built into a body thereof, for communication by means of RFID (Radio Frequency Identification), which is a contactless IC (Integrated Circuit) chip, and the like, are becoming common (for example, see Japanese Publication No. 2004-227046). In addition, as shown in Japanese Publication No. 2004-227046, although portable wireless devices are generally provided with a retractable main antenna outside a body thereof, for communicating with a mobile communication network, portable wireless devices with a main antenna built into a body thereof, for a more sophisticated design, are becoming common recently.

Incidentally, no conventional portable wireless device has been configured, even if a plurality of antennas are provided thereto, such that one antenna actively acts on any one of the other antennas. In other words, conventional portable wireless devices, even if a plurality of antennas are provided thereto, have been far from utilizing those antennas effectively.

SUMMARY

The present invention has been made in view of the above-mentioned problems, and one objective thereof is to provide a portable wireless device including a plurality of antennas, which allows for effective use of the plurality of antennas.

In order to solve the above problems, the portable wireless device according to the present invention is characterized by including: a body; a first communication unit, which is arranged in the body, and which includes a first antenna unit that communicates with an external device by way of a first usable frequency band, and a first information processing unit that performs predetermined processing with respect to information communicated by the first antenna unit; a second communication unit, which is arranged in the body, and which includes a second antenna unit that is disposed in the vicinity of the first antenna unit and communicates by way of a second usable frequency band that is higher than the first usable frequency band, and a second information processing unit that performs predetermined processing with respect to information communicated by the second antenna unit; and a high-frequency cutoff unit for cutting off high frequency to the first antenna unit so as to serve as a passive element of the second antenna unit.

Moreover, in the above portable wireless device, it is preferable that the high-frequency cutoff unit cuts off high frequency to the first antenna unit such that a length thereof is a half wavelength or a quarter wavelength of the usable frequency band of the second antenna unit.

In addition, in the above portable wireless device, it is preferable that the second usable frequency band of the second antenna unit is a frequency band overlapping a high-order secondary resonance point of the first usable frequency band of the first antenna unit, the first antenna unit is a magnetic field antenna, and the high-frequency cutoff unit is a band limiting element, which is connected to the magnetic field antenna, and which exhibits high impedance in a frequency band relating to the high-order secondary resonance point.

Furthermore, in the above portable wireless device, it is preferable that a portion of the first antenna unit, which serves as the passive element of the second antenna unit having high frequency cut off by the high-frequency cutoff unit, is provided in a position facing the second antenna unit.

Moreover, in the portable wireless device, the first communication unit is a contactless IC (Integrated Circuit) chip that communicates with an external device by using electromagnetic induction or electromagnetic coupling.

In addition, the second communication unit is disposed at a position to an extent that interference with the first antenna unit would arise.

Furthermore, in the portable wireless device, it is preferable that the first communication unit is arranged in the body and includes a third antenna unit that communicates with an external device by way of a third usable frequency band, and a third information processing unit that performs predetermined processing with respect to information communicated by the third antenna unit, and the high-frequency cutoff unit cuts off high frequency to the first antenna unit and the third antenna unit so as to become a passive element of the second antenna unit.

Moreover, the portable wireless device preferably includes a high frequency coupling unit for coupling, at high frequency, the first antenna unit and the third antenna unit having high frequency cut off, so as to become a passive element of the second antenna unit.

In addition, in the portable wireless device, it is preferable that the high frequency coupling unit limits signals in the first usable frequency band and the third usable frequency band.

According to the present invention, in a wireless device having a plurality of antennas, it is possible to effectively utilize the antennas.

EXPLANATION OF REFERENCE NUMERALS

Figure 1:
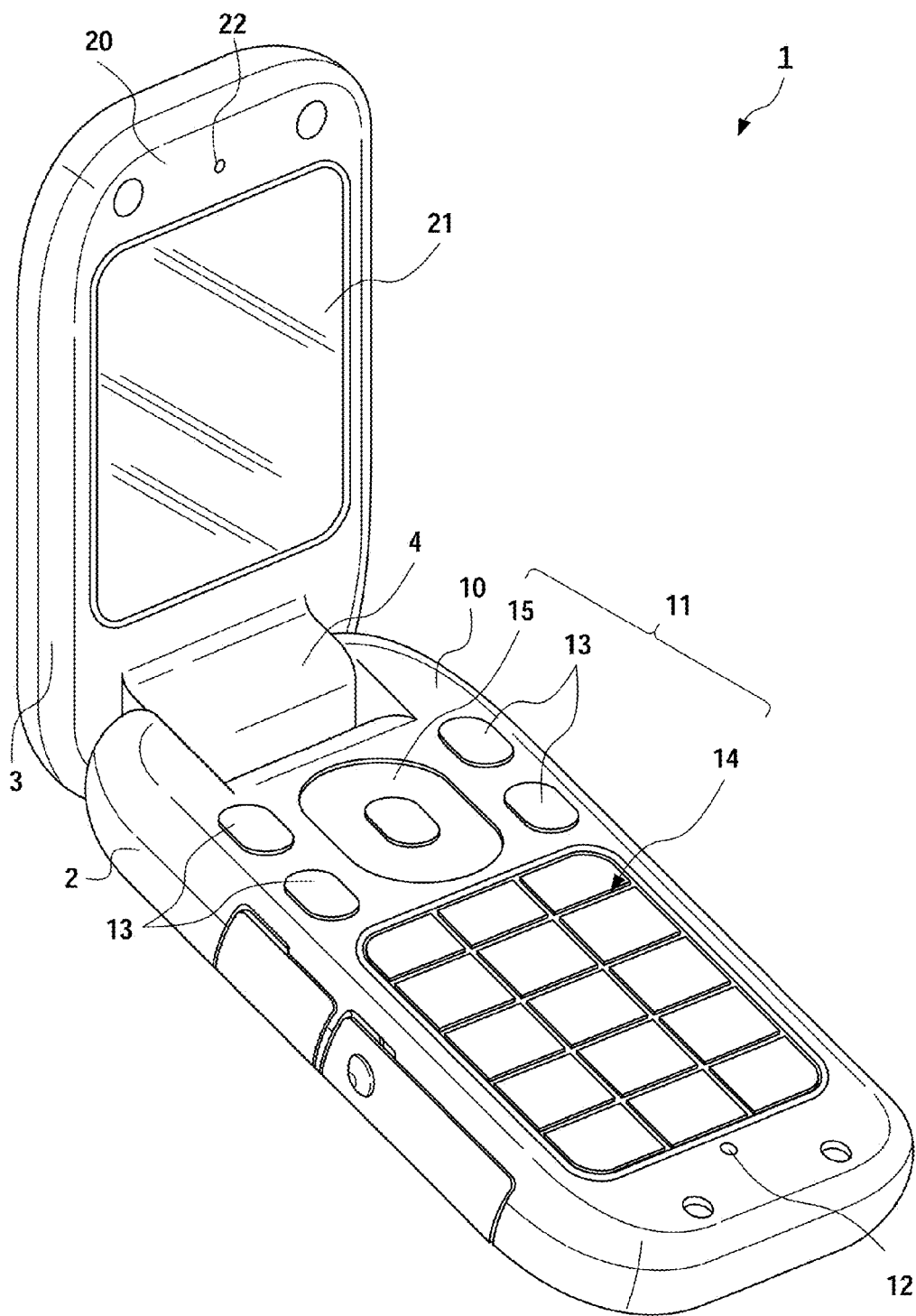
FIG. 1 is a perspective view showing an appearance of a cellular telephone device according to the present invention.

1 cellular telephone device
2 operation unit side body
3 display unit side body
4 hinge mechanism
40 substrate
41 RFID portion
42 rear case portion
50 magnetic field antenna
51 RFID chip
52 capacitor
70 main antenna
80 band limiting element

DETAILED DESCRIPTION

A description is provided hereinafter regarding an embodiment of the present invention.

FIG. 1 is a perspective view showing an appearance of a cellular telephone device 1 as an example of the portable wireless device according to the present invention. It should be noted that, although FIG. 1 shows a so-called folder-type cellular telephone device, the present invention is not limited thereto.

The cellular telephone device 1 is configured to include an operation unit side body 2 and a display unit side body 3. The operation unit side body 2 is configured to include, on a front face 10 thereof, an operation button set 11 and a sound input unit 12 to which sounds, which a user of the cellular telephone device 1 produces during a phone call, are input. The operation button set 11 includes: feature setting operation buttons 13 for operating various settings and various features such as a telephone number directory feature and a mail feature; input operation buttons 14 for inputting digits of a telephone number and characters for mail; and a selection operation button 15 that performs selection of the various operations and scrolling.

The display unit side body 3 is configured to include, on a front face portion 20, a display 21 for displaying various information, and a sound output unit 22 for outputting sound of the other party of a conversation.

In addition, the abovementioned operation button set 11, the sound input unit 12, the display 21, and the sound output unit 22 compose a processing unit 62 to be described later.

Furthermore, an upper end portion of the operation unit side body 2 and a lower end portion of the display unit side body 3 are connected via a hinge mechanism 4. Moreover, the cellular telephone device 1 can be made into a state in which the operation unit side body 2 and the display unit side body 3 are opening each other (opened state), and into a state in which the operation unit side body 2 and the display unit side body 3 are closing each other (closed state), as the operation unit side body 2 and the display unit side body 3, connected via the hinge mechanism 4, pivot with respect to each other.

Figure 2:
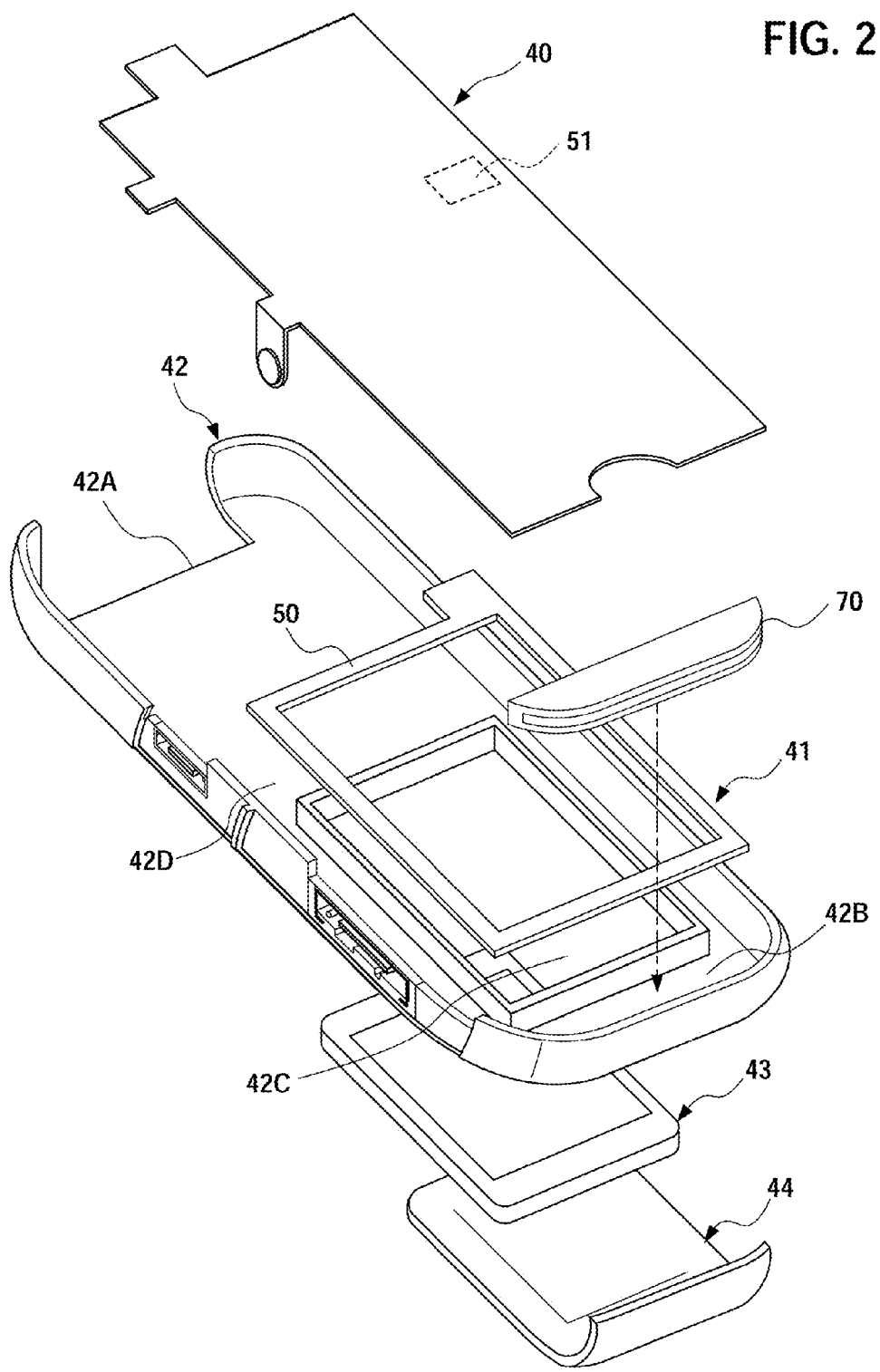
FIG. 2 is a perspective view showing a configuration of an operation unit side body included in the cellular telephone device according to the present invention.

FIG. 2 is an exploded perspective view of a part of the operation unit side body 2. The operation unit side body 2 is composed of a substrate 40, an RFID portion 41, a rear case portion 42, a rechargeable battery 43, and a battery cover 44, as shown in FIG. 2.

On the substrate 40, a device such as a CPU for performing predetermined arithmetic processing is mounted, and a predetermined signal is transmitted thereto when a user operates the operation button set 11.

The RFID portion 41 includes a magnetic field antenna 50 (a first antenna unit) for communicating with external devices by way of a first usable frequency band, and an RFID chip 51 (a first information processing unit) that performs predetermined processing with respect to information communicated by the magnetic field antenna 50. It should be noted that the RFID chip 51 is disposed on the substrate 40 facing the RFID portion 41 as shown in FIG. 2. Moreover, the RFID portion 41 is later described in detail.

The rear case portion 42 includes: a hinge mechanism fixing portion 42A for fixing the hinge mechanism 4; a main antenna housing portion 42B for housing a main antenna 70 (a second antenna unit), which communicates using a second usable frequency band that is higher than the first usable frequency band; a battery housing portion 42C for housing the rechargeable battery 43; and an RFID portion fixing portion 42D for fixing the RFID portion 41. It should be noted that the main antenna 70 is described later in detail.

Figure 3:
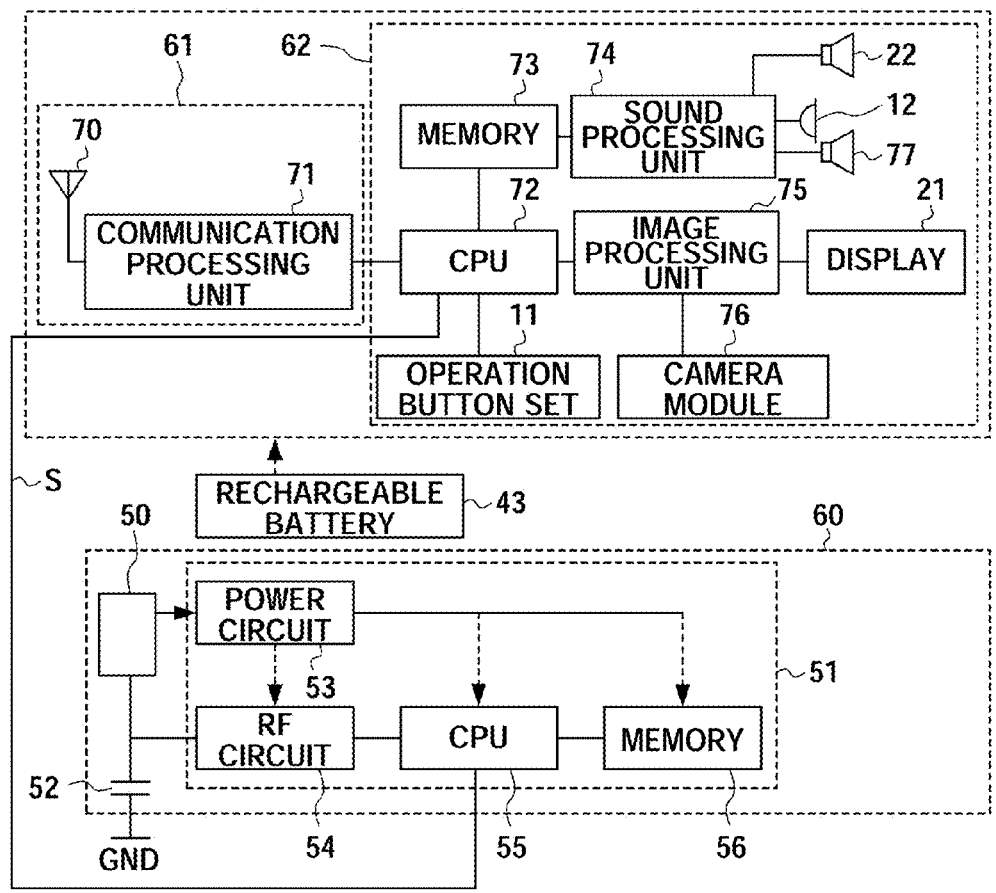
FIG. 3 is a block diagram showing features of the cellular telephone device according to the present invention.

FIG. 3 is a functional block diagram showing features of the cellular telephone device 1. As shown in FIG. 3, the cellular telephone device 1 includes: a first communication unit 60 that is configured with the RFID portion 41; a second communication unit 61 that communicates with external terminals; and a processing unit 62 that processes information communicated by the second communication unit 61.

The first communication unit 60 is composed of the RFID portion 41 and includes the magnetic field antenna 50 that communicates with external devices by way of the first usable frequency band (for example, 13.56 MHz), the RFID chip 51, and a capacitor 52 for adjustment.

The magnetic field antenna 50 includes a coil wound in a multiple spiral shape on a sheet made of PET (polyethylene terephthalate) material, and receives a signal of the first usable frequency band transmitted from external devices.

The RFID chip 51 includes: a power circuit 53 that generates a predetermined voltage based on electrical power induced by a signal received by the magnetic field antenna 50; an RF circuit 54 that performs signal processing such as modulation processing or demodulation processing with respect to a signal communicated by the magnetic field antenna 50; a CPU 55 that performs predetermined arithmetic processing; and memory 56 that stores predetermined data. The power circuit 53 is composed of a DC-DC converter, for example.

Here, behavior of the first communication unit 60 is described.

The magnetic field antenna 50, when approaching to within a predetermined distance to a reading/writing device disposed outside thereof, receives radio waves transmitted from the reading/writing device (modulated by a carrier frequency having the first usable frequency band (for example, 13.56

MHz)). It should be noted that, a predetermined adjustment (tuning) is made to the capacitor 52 so that the radio waves of the first usable frequency band are transmitted to the RF circuit 54 via the magnetic field antenna 50.

In addition, electromotive force is generated by an electromagnetic induction effect when the electromagnetic waves are received by the magnetic field antenna 50.

The power circuit 53 generates a predetermined power supply voltage from the electromotive force generated by the electromagnetic induction effect, and supplies the power supply voltage to the RF circuit 54, the CPU 55, and the memory 56. In addition, the RF circuit 54, the CPU 55, and the memory 56 are switched from a halt state to an active state when the predetermined power supply voltage is supplied from the power circuit 53.

The RF circuit 54 performs signal processing such as demodulation with respect to a signal of the first usable frequency band received via the magnetic field antenna 50, and transmits the processed signal to the CPU 55.

The CPU 55 writes or reads data to or from the memory 56, based on the signal received from the RF circuit 54. In a case of reading data from the memory 56, the CPU 55 transmits the data to the RF circuit 54. The RF circuit 54 performs signal processing such as modulation with respect to the data being read from the memory 56, and transmits the data to the external reading/writing device via the magnetic field antenna 50.

Furthermore, although the first communication unit 60 is described above to be of a so-called passive, induction field type (electromagnetic induction type) without a power source, the present invention is not limited thereto, and the first communication unit 60 can also be of a passive mutual induction type (electromagnetic coupling type) or a passive radiation field type (radio wave type), or an active type with a power source. In addition, an access method of the first communication unit 60 is described as a read/write type; however, the present invention is not limited thereto, and the access method can also be of a read-only type, a write-once type, and the like.

Moreover, as shown in FIG. 3, the second communication unit 61 includes: a main antenna 70 that communicates with external devices by way of the second usable frequency band that is higher than the first usable frequency band; and a communication processing unit 71 (a second information processing unit) that performs signal processing such as modulation processing or demodulation processing. In addition, the second communication unit 61 is powered by the rechargeable battery 43.

The main antenna 70 communicates with external devices by way of the second usable frequency band (for example, 800 MHz). It should be noted that, although 800 MHz is set as the second usable frequency band in the present embodiment, other frequency bands can also be used. In addition, the main antenna 70 can be configured as a so-called dual band compatible antenna that can accept, in addition to the second usable frequency band, a third usable frequency band (for example, 2 GHz), or as a multi-band compatible antenna that can further accept a fourth usable frequency band.

The communication processing unit 71 performs demodulation processing of a signal received by the main antenna 70 to transmit the processed signal to the processing unit 62, or performs modulation processing of a signal received from the processing unit 62 to transmit the processed signal to an external device via the main antenna 70.

As shown in FIG. 3, the processing unit 62 includes: the operation button set 11; the sound input unit 12; the display 21; the sound output unit 22; a CPU 72 that performs predetermined arithmetic processing; memory 73 that stores predetermined data; a sound processing unit 74 that performs predetermined sound processing; an image processing unit 75 that performs predetermined image processing; a camera module 76 that captures an image of an object; and a speaker 77 that outputs ringtones and the like. In addition, the processing unit 62 is powered by the rechargeable battery 43. It should be noted that, as shown in FIG. 3, the cellular telephone device 1 is configured such that: the CPU 55 and the CPU 72 are connected by a signal line S via which information processed by the first communication unit 60 is transmitted to the image processing unit 75; and information processed by the image processing unit 75 is displayed on the display 21.

Figure 4:
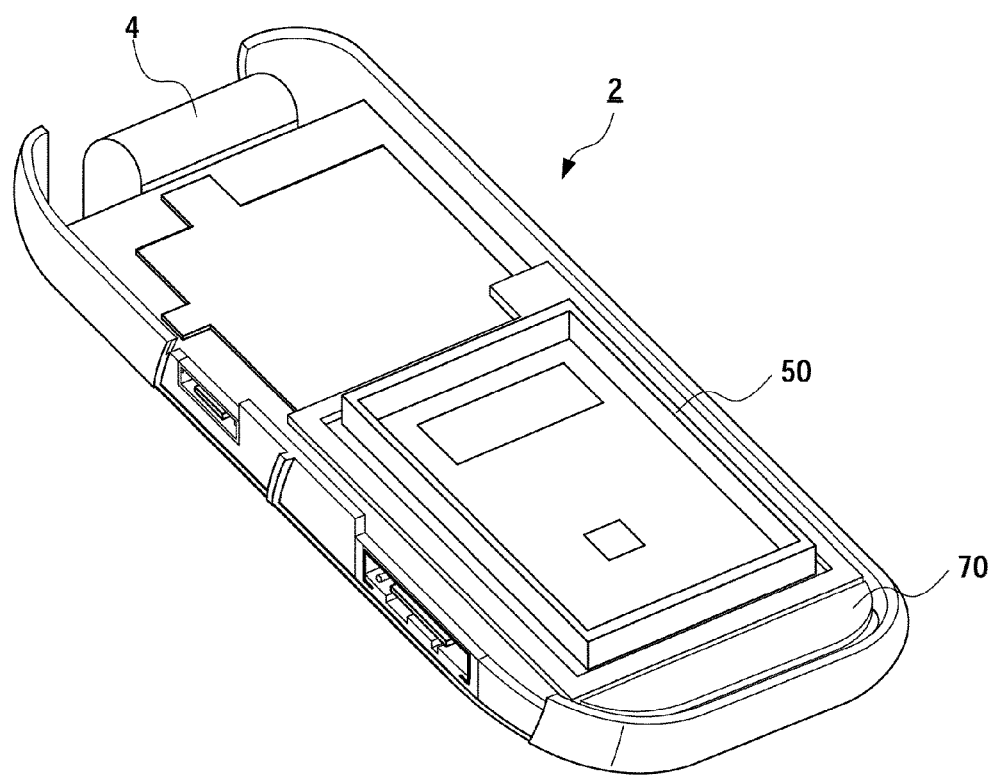
FIG. 4 is a perspective view showing a positional relationship between a magnetic field antenna and a main antenna provided in the cellular telephone device according to the present invention.

In addition, FIG. 4 is a diagram showing a positional relationship between the magnetic field antenna 50 of the RFID portion 41 and the main antenna 70. It should be noted that the rear case portion 42 is omitted in FIG. 4.

As shown in FIG. 4, the magnetic field antenna 50 and the main antenna 70 are in the vicinity of each other (several millimeters). In a case in which the two antennas are disposed in the vicinity of each other in this manner, problems occur due to interference between the magnetic field antenna 50 and the main antenna 70.

More specifically, the magnetic field antenna 50 has low-order and high-order secondary resonance points in cycles, other than the usable frequency band (13.56 MHz). In particular, when the high-order secondary resonance point (hereinafter referred to as high-order resonance point) overlaps the usable frequency band (800 MHz or the like) of the main antenna 70, the gain of the main antenna 70 is degraded (to be described later in detail with reference to FIG. 10).

Given this, the cellular telephone device 1 according to the present embodiment adopts a configuration that improves the gain in the usable frequency band of the main antenna 70 by utilizing the magnetic field antenna 50 as a passive element of the main antenna 70.

Figure 5:
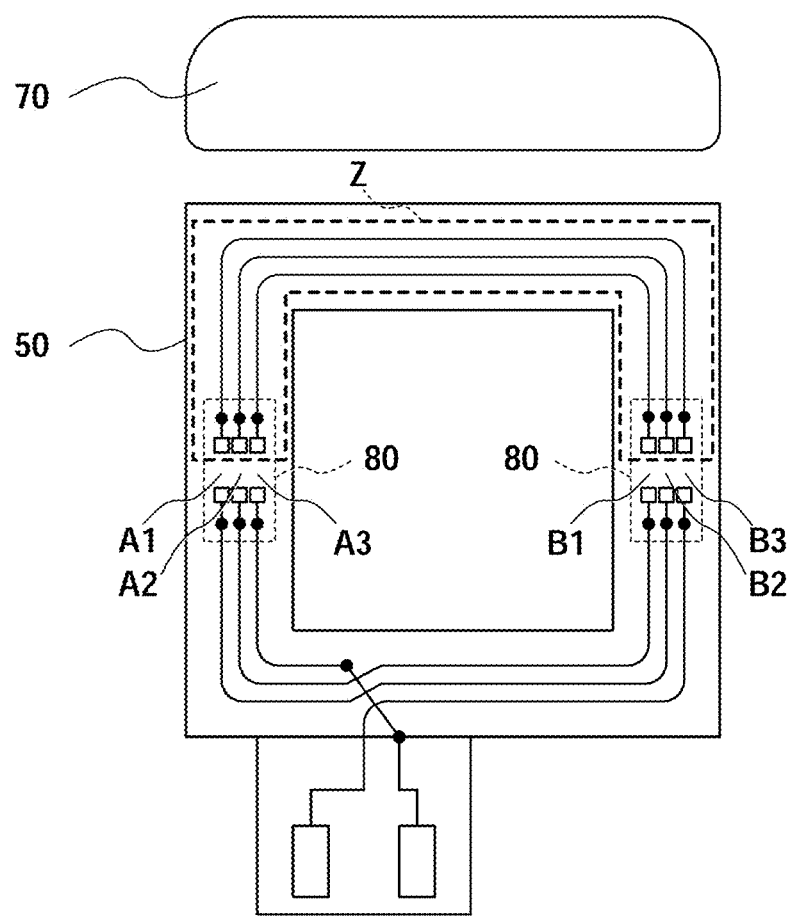
FIG. 5 is a diagram showing a first configuration of the magnetic field antenna provided in the cellular telephone device according to the present invention.
Figure 6:
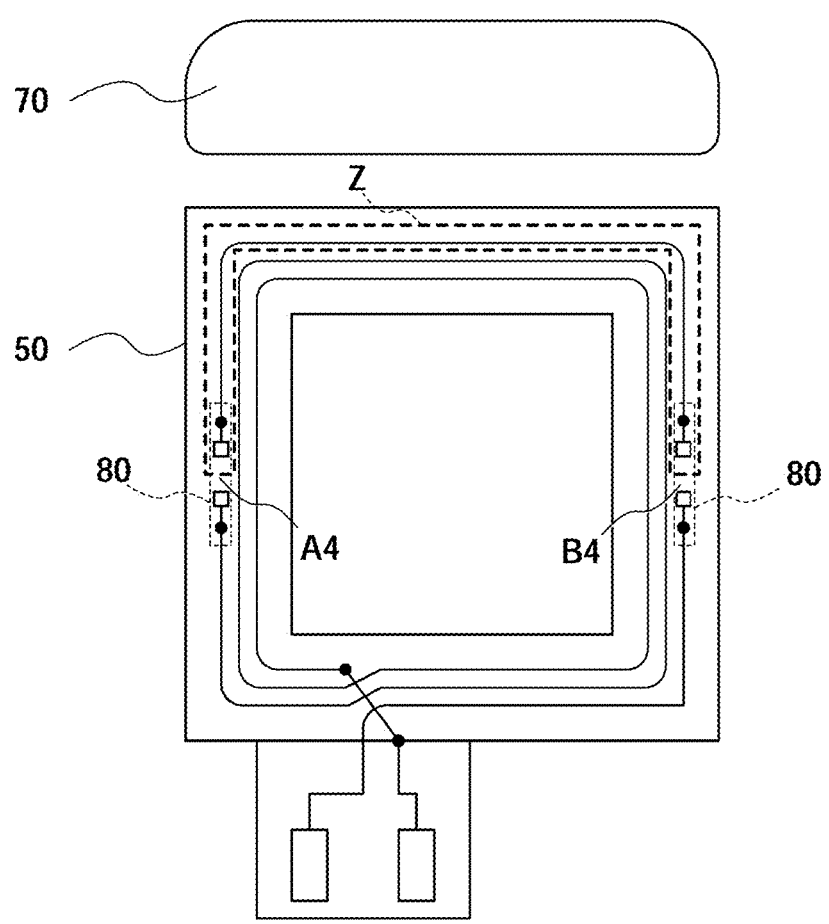
FIG. 6 is a diagram showing a second configuration of the magnetic field antenna provided in the cellular telephone device according to the present invention.

More specifically, as shown in FIG. 5, the cellular telephone device 1 is provided with patterns (A1, A2, A3, B1, B2 and B3) for adding band limiting elements 80 (high-frequency cutoff unit), which are composed of beads and a parallel resonance circuit, in predetermined positions of the magnetic field antenna 50. It should be noted that the patterns (A1, A2, A3, B1, B2 and B3) each denote a terminal for adding the band limiting elements 80. Moreover, although the band limiting elements 80 are described as being added to each line configuring the magnetic field antenna 50 in FIG. 5, it is not limited thereto in the present embodiment, and a configuration may be employed in which the patterns (A4 and B4) are added to only one line as shown in FIG. 6.

In addition, the band limiting elements 80, in which the high-order resonance point of the magnetic field antenna 50 has been adjusted to a constant that can be reduced, are added to the patterns.

Figure 7:
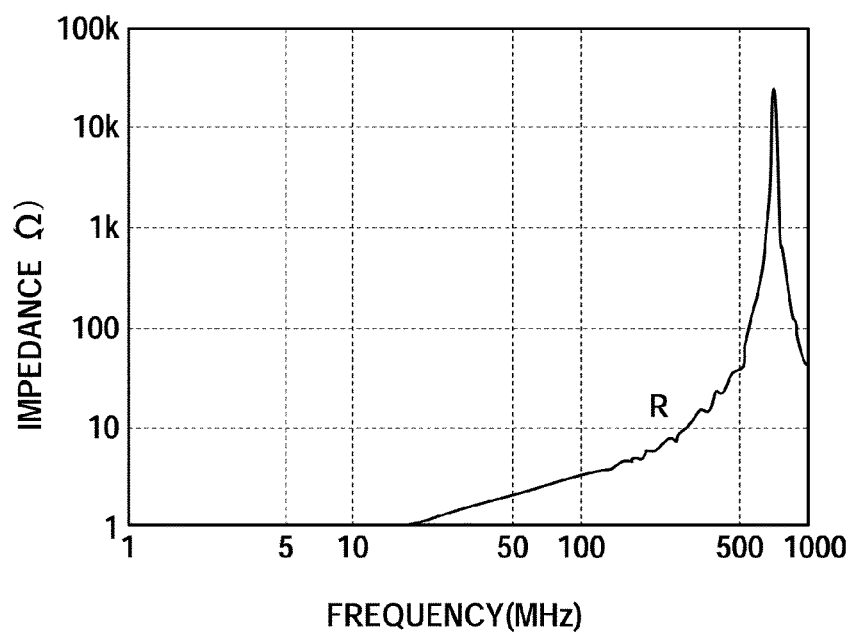
FIG. 7 is a graph showing characteristics of a band limiting element.

Here, features of the band limiting elements 80 are described. As shown in FIG. 7, the band limiting elements 80 have a characteristic in which impedance is high (R component is high) in the high frequency band (around 800 MHz), and has a characteristic in which impedance is low (R component is low) in the low frequency band (around 13 MHz). In other words, the band limiting elements 80 have a characteristic to convert a high frequency signal into heat and absorb it in the high frequency band. Therefore, in a case in which a high-order secondary resonance point (13.56 MHz×n) of the magnetic field antenna 50 overlaps a usable frequency band (800 MHz) of the main antenna 70, a configuration is employed in which the band limiting elements 80, which cause the high-order secondary resonance point around 800

MHz of the magnetic field antenna 50 to be a maximum value of impedance, are added to the magnetic field antenna 50, thereby making it possible to preferably reduce the frequency component of the high-order secondary resonance point around 800 MHz of the magnetic field antenna 50, and to preferably suppress the gain degradation of the main antenna 70 due to the high-order secondary resonance point overlapping the usable frequency band of the main antenna 70.

Moreover, the magnetic field antenna 50 is configured such that an element configured from one band limiting element 80 to another band limiting element 80 on a side adjacent to the main antenna 70 (a region Z encompassed by a broken line in FIGS. 5 and 6) serves as a passive element of the main antenna 70. It should be noted that the element is hereinafter referred to as a passive element.

More specifically, the passive element is configured to be of a half wavelength ($\lambda/2$) or a quarter wavelength ($\lambda/4$) of the usable frequency band of the main antenna 70. In this way, with such a configuration in which the passive element is of the half wavelength or the quarter wavelength of the main antenna 70, it is not necessary to unnecessarily lengthen the length of the element of the magnetic field antenna 50, and this is convenient in terms of design. It should be noted that the length of the passive element is not limited to the half wavelength ($\lambda/2$) or the quarter wavelength ($\lambda/4$) of the usable frequency band of the main antenna 70, and it may be another length, for example, such as double or quadruple the usable frequency band of the main antenna 70, and the band limiting elements 80 are disposed on the element of the magnetic field antenna 50 in accordance with the length.

In this way, patterns for disposing the band limiting elements 80 are provided in predetermined positions of the magnetic field antenna 50, and the band limiting elements 80 for which a constant is preferably adjusted are disposed on the patterns, thereby making it possible to cause a portion of the magnetic field antenna 50 to serve as a passive element of the main antenna 70.

Moreover, as described above, the passive element is of a predetermined length in accordance with the usable frequency band of the main antenna 70, and is configured to be electromagnetically coupled with the main antenna 70, a result of which an electric current (high frequency signal) intensively flows therethrough.

In addition, by reducing the high-order secondary resonance point of the magnetic field antenna 50 by the band limiting elements 80, the gain degradation of the main antenna 70 can be reduced. It should be noted that, although a means for reducing the high-order secondary resonance point by using a lowpass filter or the like is also effective, such a means requires a GND pattern to be provided in the vicinity thereof, and therefore a configuration in which the band limiting elements 80 configured by beads or a parallel resonant circuits is more advantageous.

Therefore, in the cellular telephone device 1 according to the present embodiment, the band limiting elements 80 are provided in predetermined positions of the magnetic field antenna 50, a result of which a passive element having a length corresponding to a predetermined wavelength of the usable frequency band of the main antenna 70 exists in a position of a predetermined distance away from the main antenna 70 that is a feed element, thereby making it possible to improve the gain in the usable frequency band of the main antenna 70. The reason for this is that portions of the band limiting elements 80 (both end portions of the passive element), which are provided in predetermined positions of the magnetic field antenna 50, can be considered as open ends in terms of the main antenna 70 side, whereby the passive element and the main antenna 70 are electromagnetically coupled, signals of the usable frequency band radiated (emitted) from the main antenna 70 are absorbed by the passive element, and the radiated signals are not reflected to the main antenna 70 side.

Figure 8:
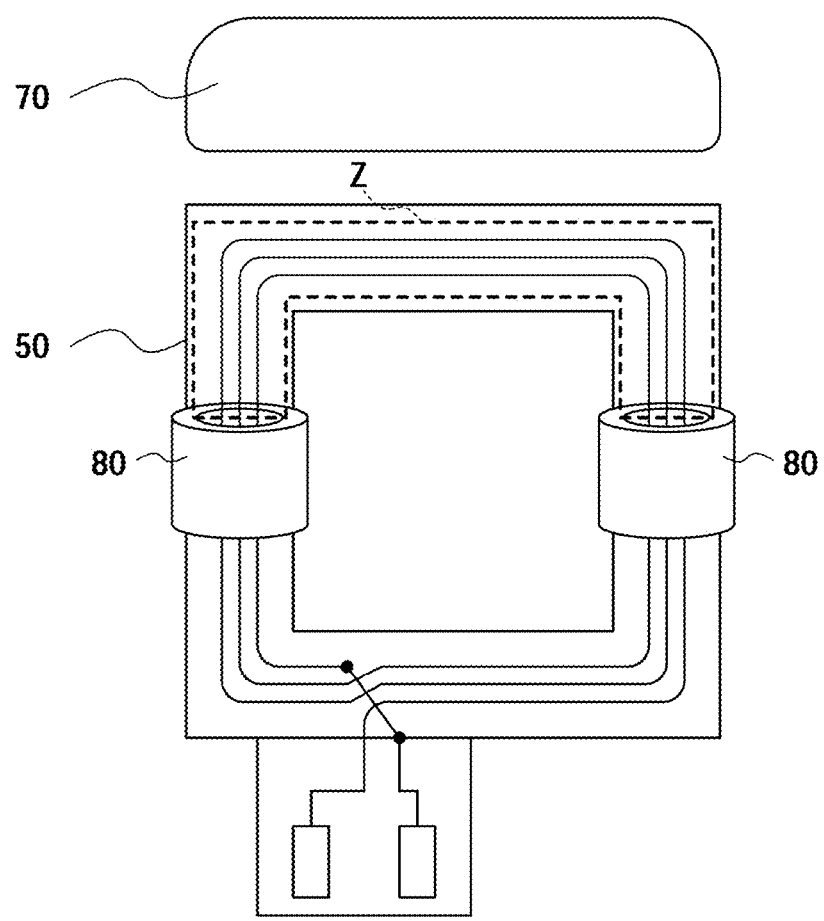
FIG. 8 is a diagram showing an eighth configuration of the magnetic field antenna provided in the cellular telephone device according to the present invention.

Moreover, the band limiting elements 80 may be configured with ferrite cores as shown in FIG. 8.

In addition, the RFID portion 41 adjusts a resonance (tuning) frequency to 13.56 MHz based on a reactance value (L) of the magnetic field antenna 50 and the reactance value (C) of the capacitor 52. Here, the value L is determined by a size of the magnetic field antenna 50, the number of turns of the coil, the presence of material (a dielectric material or a magnetic material) provided therearound, or a distance from metal disposed in the vicinity thereof.

Furthermore, since the stray capacitance of the band limiting elements 80 is small (on the order of several pF), the usable frequency of the magnetic field antenna 50 is not affected.

Moreover, according to the present embodiment, since the gain in the usable frequency band of the main antenna 70 can be improved by adding the band limiting elements 80 in predetermined positions of the magnetic field antenna 50, the magnetic field antenna 50 can be freely designed regardless of a size thereof, the number of turns of the coil, the presence of material provided therearound, or a distance from metal disposed in the vicinity thereof.

Figure 9:
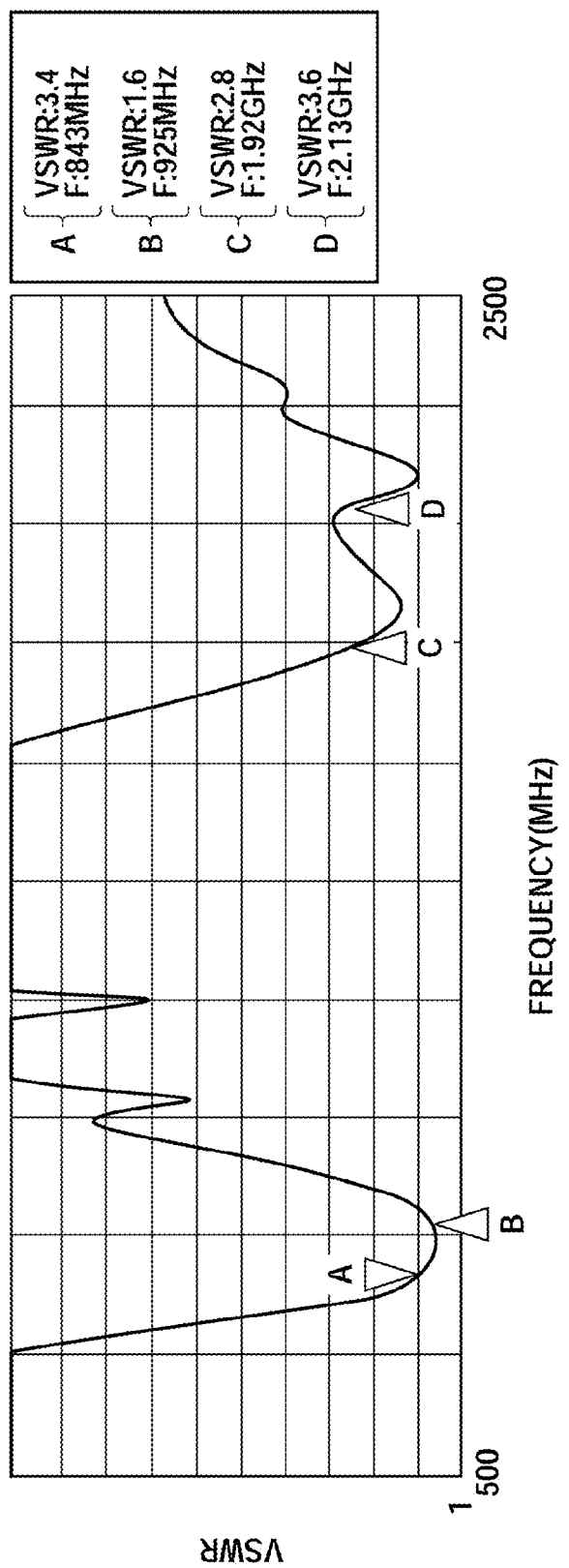
FIG. 9 is a graph showing a result of measuring VSWR in a case in which the band limiting element is added to the magnetic field antenna.
Figure 10:
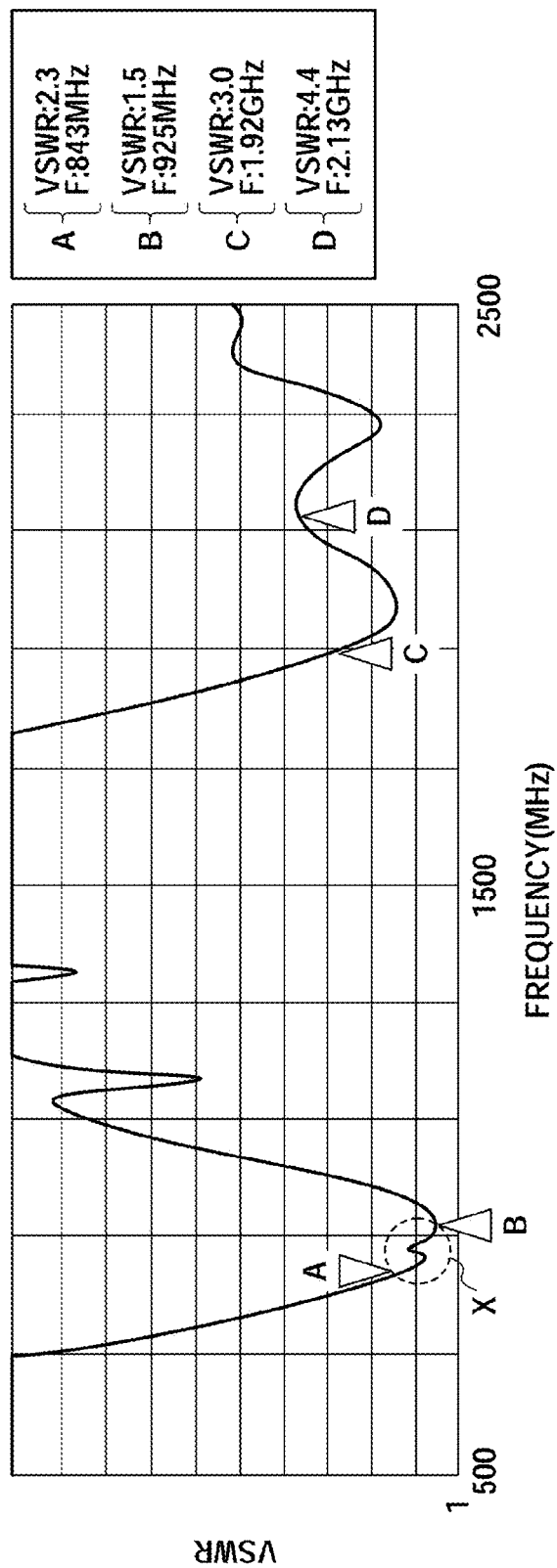
FIG. 10 is a graph showing a result of measuring VSWR in a case in which the band limiting element is not added to the magnetic field antenna.

Moreover, FIG. 9 shows a result of measuring VSWR (Voltage Standing Wave Ratio) in a frequency range of 500 MHz to 2.5 GHz in a case in which the band limiting elements 80 are added in predetermined positions of the magnetic field antenna 50 (in the cellular telephone device 1 according to the present embodiment); and FIG. 10 shows a result of measuring VSWR in a frequency range of 500 MHz to 2.5 GHz in a case in which the band limiting elements 80 are not added to the magnetic field antenna 50 (in a conventional cellular telephone device). It should be noted that the measurement was performed by connecting a measurement apparatus (network analyzer) to a feeding point of the main antenna 70 of the cellular telephone device 1. In addition, the measurement was performed by using a cellular telephone device with a band width of a usable frequency band of 843 MHz to 925 MHz (point A to point B in FIGS. 9 and 10 and that of 1.92 GHz to 2.18 GHz (point C to point D in FIGS. 9 and 10).

As can be seen from FIGS. 9 and 10, the influence of the high-order resonance point of the magnetic field antenna 50 appeared (X in FIG. 10) in a range of 843 MHz to 925 MHz (point A to point B in FIG. 10) in a case in which the band limiting elements 80 were not added in predetermined positions of the magnetic field antenna 50 (FIG. 10), while the influence of the high-order resonance point of the magnetic field antenna 50 disappeared in the range of 843 MHz to 925 MHz (point A to point B in FIG. 9), since the gain in the usable frequency band of the main antenna 70 was improved, and in addition, the high-order secondary resonance point of the magnetic field antenna 50 was reduced by the band limiting elements 80, in a case in which the band limiting elements 80 were added in predetermined positions of the magnetic field antenna 50 (FIG. 9). Furthermore, in the present embodiment, since the main antenna 70 and the passive element are disposed to face each other, the electromagnetic coupling between the passive element and the main antenna 70 is strengthened, and the gain in the usable frequency band of the main antenna 70 can be improved.

In this way, in the cellular telephone device 1 according to the present embodiment, by adding the band limiting elements 80 in predetermined positions of the magnetic field antenna 50, the gain in the usable frequency band (800 MHz) of the main antenna 70 can be improved, and in addition, the influence due to the high-order resonance point of the magnetic field antenna 50 can be avoided, without affecting the usable frequency band (13.56 MHz) of the magnetic field antenna 50. Moreover, conventionally, in a case in which a plurality of antennas having different usable frequency bands are provided, a configuration has been employed in which the antennas are disposed as far as possible from each other in order to avoid mutual interference, and thus it has not been possible to effectively utilize the space inside the body. According to the present embodiment, the mutual gain degradation does not arise even in a configuration in which the magnetic field antenna 50 and the main antenna 70 are disposed adjacently; therefore, it is possible to effectively utilize the space inside the body while placing emphasis on design characteristics, and to achieve size reduction of the body itself.

It should be noted that, in the aforementioned embodiment, although a case is assumed in which interference would arise since the main antenna 70 and the magnetic field antenna 50 are adjacently disposed, the present invention is effective for any case in which the influence due to the high-order resonance point of the magnetic field antenna 50 affects a usable frequency band of other antennas, regardless of a positional relationship between the antennas.

In addition, in the aforementioned embodiment, although the RFID is shown as a component for communicating with external devices by the first usable frequency band, it is not particularly limited thereto, and another component may be used as long as the component would cause interference with the usable frequency band of the main antenna 70.

Furthermore, in order to provide the two functions of a card function and a reader function to a portable wireless device, a configuration is conceivable in which two antennas (a passive-type magnetic field antenna and an active-type magnetic field antenna) are disposed in the body; and even in such a configuration in which a plurality of antennas are arranged together with the main antenna 70 in the body, each portion of the plurality of antennas can serve as a passive element of the main antenna 70 by providing patterns for disposing the band limiting elements 80 in predetermined positions of the plurality of antennas, and disposing, on the patterns, the band limiting elements 80 for which a constant has been preferably adjusted. Here, the card function refers to a function to detect a passive-type magnetic field antenna from an external device side having a reader/writer function, thereby transmitting and receiving data; and the reader/writer function refers to a function to spontaneously detect an external device from an active-type magnetic field antenna side, thereby transmitting and receiving data.

Figure 11:
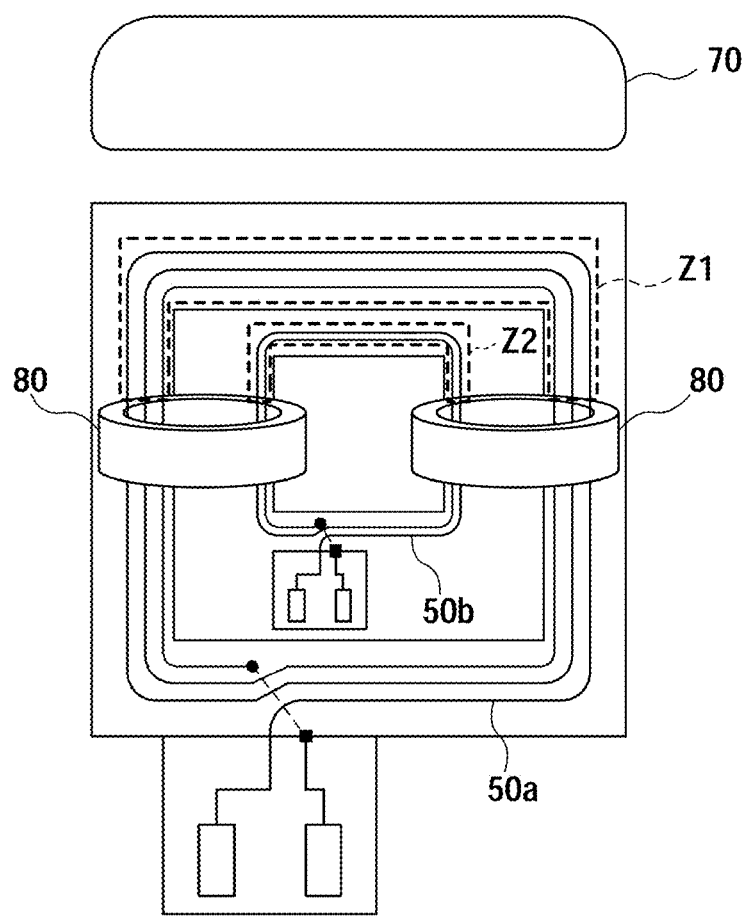
FIG. 11 is a diagram showing a third configuration of the magnetic field antenna provided in the cellular telephone device according to the present invention.
Figure 12:
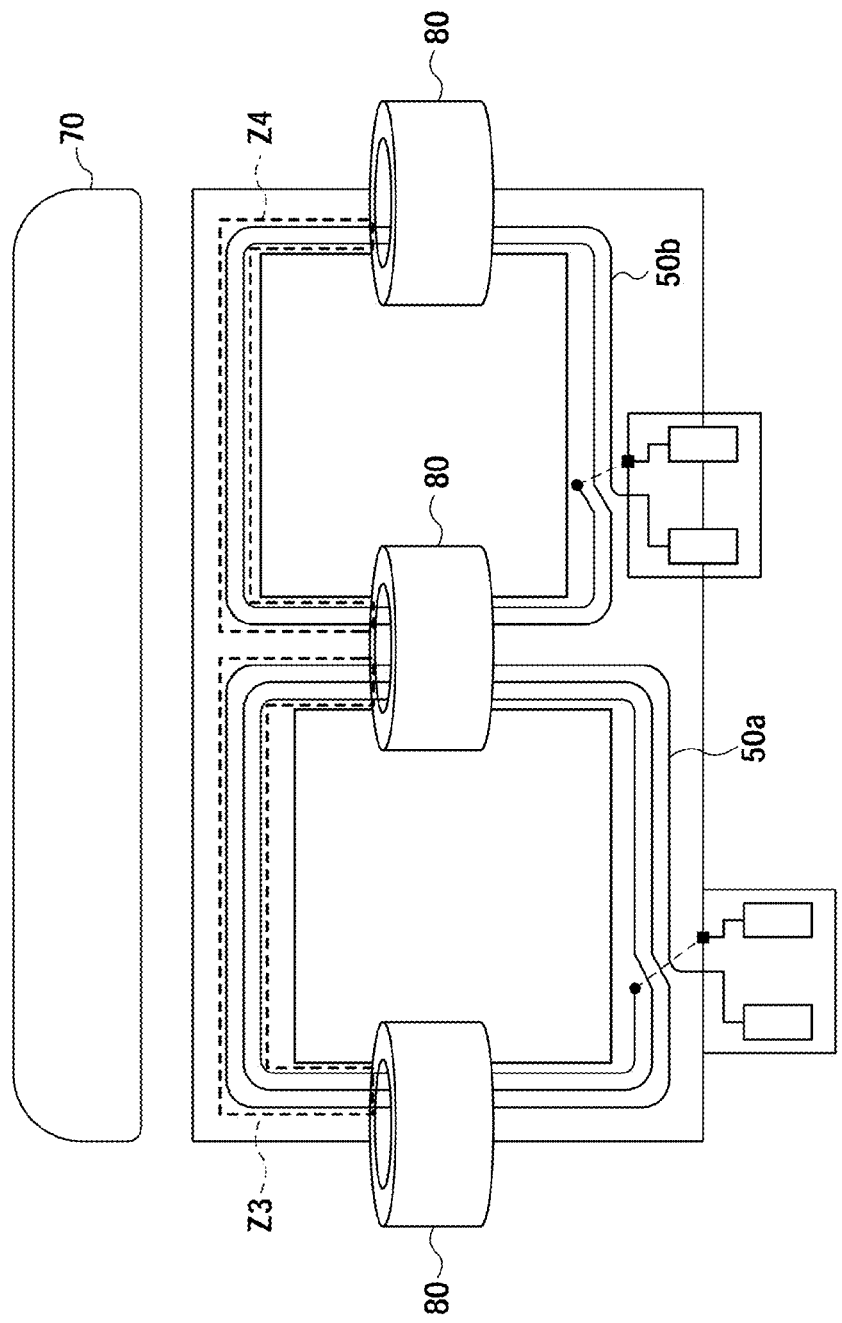
FIG. 12 is a diagram showing a fourth configuration of the magnetic field antenna provided in the cellular telephone device according to the present invention.

FIG. 11 is a diagram showing an example of this configuration, and shows a configuration of passive elements (regions Z1 and Z2 surrounded by dashed lines in FIG. 11), each of which is configured with the band limiting element 80 (ferrite core), in which a passive-type magnetic field antenna 50a and an active-type magnetic field antenna 50b that is in an inner region thereof are arranged together with the main antenna 70 in the body. Moreover, FIG. 12 is a diagram showing an example of this configuration, and shows a configuration of passive elements (regions Z3 and Z4 surrounded by dashed lines in FIG. 12) configured with the band limiting elements 80 (ferrite cores), in which the passive-type magnetic field antenna 50a and the active-type magnetic field antenna 50b are arranged together with the main antenna 70 in the body.

In this way, by configuring the passive element to each of the passive-type magnetic field antenna 50a and the active-type magnetic field antenna 50b, each passive element having a length corresponding to a predetermined wavelength of the usable frequency band of the main antenna 70 exists at a predetermined distance away from the main antenna 70 that is a feed element, thereby making it possible to improve the gain in the usable frequency band of the main antenna 70.

Figure 13:
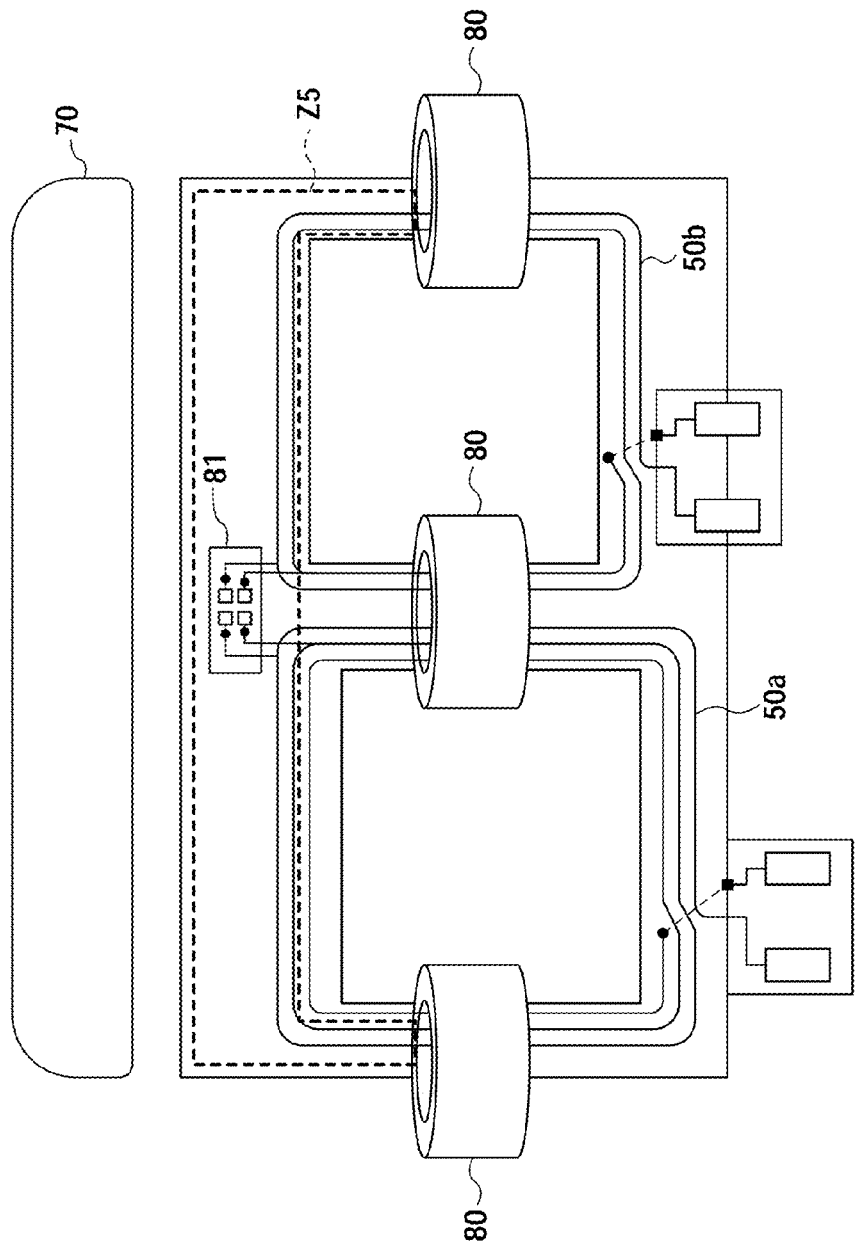
FIG. 13 is a diagram showing a fifth configuration of the magnetic field antenna provided in the cellular telephone device according to the present invention.

In addition, as shown in FIG. 13, in a configuration in which the passive-type magnetic field antenna 50a and the active-type magnetic field antenna 50b are arranged together with the main antenna 70 in the body, the frequency bands of the magnetic field antenna 50a and the magnetic field antenna 50b may be coupled in the usable frequency band of the main antenna 70, and a capacitor 81 that is adjusted to limit the frequency bands of the magnetic field antenna 50a and the magnetic field antenna 50b may be connected thereto in each of the usable frequency bands of the magnetic field antenna 50a and the magnetic field antenna 50b.

As a result, in the usable frequency band of the main antenna 70, the magnetic field antenna 50a and the magnetic field antenna 50b are coupled at high frequency by the capacitor 81, and a passive element (a region Z5 surrounded by a dashed line in FIG. 13) is configured, in which a portion of the magnetic field antenna 50a and a portion of the magnetic field antenna 50b are integrated. Therefore, even if the length of each antenna in the passive element is not sufficient, the length of the passive element configured with a portion of the magnetic field antenna 50a and a portion of the magnetic field antenna 50b is sufficiently secured, thereby making it possible to further improve the gain in the usable frequency band of the main antenna 70. Furthermore, in each of the usable frequency bands of the magnetic field antenna 50a and the magnetic field antenna 50b, since each of the usable frequency bands of the magnetic field antenna 50a and the magnetic field antenna 50b is limited at high frequency by the capacitor 81, the possibility of deteriorating the sensitivity of the passive-type magnetic field antenna 50a and the active-type magnetic field antenna 50b is reduced based on the presence of the capacitor 81.

It should be noted that the element connected to the magnetic field antenna 50a and the magnetic field antenna 50b is not limited to a capacitor, and it may be an element that is adjusted to couple the magnetic field antenna 50a and the magnetic field antenna 50b at high frequency in the usable frequency band of the main antenna 70, and to limit the usable frequency bands of the magnetic field antenna 50a and the magnetic field antenna 50b at high frequency in each of the usable frequency bands.

Moreover, in the present embodiment, although the target to be coupled at high frequency by the capacitor 81 to the magnetic field antenna 50a having high frequency cut off is the magnetic field antenna 50b having high frequency cut off, the target in the present embodiment is not limited thereto, and it may be a conductive member that can function as a passive element of the main antenna 70 by being coupled at high frequency by the capacitor 81 to the magnetic field antenna 50a having high frequency cut off. This makes it possible to easily adjust the length of the passive element of the main antenna 70.

The invention claimed is:
1. A portable wireless device comprising:
   a body;
   a first communication unit arranged in the body and including a first antenna unit that communicates with an external device by way of a first frequency band, and a first information processing unit that performs predeter- mined processing with respect to information communicated by the first antenna unit;

a second communication unit arranged in the body and including a second antenna unit that is disposed in the vicinity of the first antenna unit and communicates by way of a second frequency band, which is higher than the first frequency band, and a second information processing unit that performs predetermined processing with respect to information communicated by the second antenna unit; and a high-frequency cutoff unit for cutting off high frequency to the first antenna unit such that at least a portion of the first antenna unit becomes a passive element of the second antenna unit, wherein the high-frequency cutoff unit comprises one or more band-limiting elements in contact with the first antenna unit, and wherein the one or more band-limiting elements have high impedance in the second frequency band and low impedance in the first frequency band, wherein the high-frequency cutoff unit cuts off high frequency to the first antenna unit such that a length thereof is a half wavelength or a quarter wavelength of the usable frequency band of the second antenna unit, and wherein the second frequency band of the second antenna unit is a frequency band overlapping a high-order secondary resonance point of the first frequency band of the first antenna unit, wherein the first antenna unit is a magnetic field antenna, and wherein the high-frequency cutoff unit exhibits high impedance in a frequency band relating to the high-order secondary resonance point.

2. The portable wireless device according to claim 1, wherein the at least a portion of the first antenna unit, which serves as the passive element, is positioned adjacent to the second antenna unit.

3. The portable wireless device according to claim 1, further comprising a first communication unit comprising the first antenna unit, wherein the first communication unit is a contactless IC (Integrated Circuit) chip that communicates with an external device by using electromagnetic induction or electromagnetic coupling.

4. The portable wireless device according to claim 1, wherein the second antenna unit is disposed at a position at which interference with the first antenna unit would arise.

5. The portable wireless device according to claim 1, further comprising a first communication unit comprising the first antenna unit, wherein the first communication unit is arranged in the body and includes a third antenna unit that communicates with an external device by way of a third frequency band, and wherein the high-frequency cutoff unit further cuts off high frequency to the third antenna unit such that at least a portion of the third antenna unit becomes a passive element of the second antenna unit.

6. The portable wireless device according to claim 5, comprising a high frequency coupling unit for coupling, at high frequency, the at least a portion of the first antenna unit and the at least a portion of the third antenna unit.

7. The portable wireless device according to claim 6, wherein the high frequency coupling unit limits signals in the first frequency band and the third frequency band.

8. The portable wireless device according to claim 5, wherein the third antenna unit is positioned within an inner region of the first antenna unit.

9. The portable wireless device according to claim 1, wherein the first antenna unit is a magnetic field antenna.

10. The portable wireless device according to claim 1, wherein the one or more band-limiting elements comprise a plurality of band-limiting elements.

11. The portable wireless device according to claim 1, wherein the first antenna unit comprises a pattern comprising a plurality of lines, and wherein the one or more band-limiting elements are in contact with two or more of the plurality of lines.

12. A portable wireless device comprising:
a body;
a first antenna unit that communicates with an external device by way of a first frequency band;
a second antenna unit that is disposed in the vicinity of the first antenna unit and communicates by way of a second frequency band, which is higher than the first frequency band; and
a high-frequency cutoff unit for cutting off high frequency to the first antenna unit such that at least a portion of the first antenna unit becomes a passive element of the second antenna unit, wherein the high-frequency cutoff unit comprises one or more band-limiting elements in contact with the first antenna unit, and wherein the one or more band-limiting elements have high impedance in the second frequency band and low impedance in the first frequency band,
wherein each of the one or more band-limiting elements comprises a ferrite core.

13. A portable wireless device comprising:
a body;
a first antenna unit that communicates with an external device by way of a first frequency band;
a second antenna unit that is disposed in the vicinity of the first antenna unit and communicates by way of a second frequency band, which is higher than the first frequency band; and
a high-frequency cutoff unit for cutting off high frequency to the first antenna unit such that at least a portion of the first antenna unit becomes a passive element of the second antenna unit, wherein the high-frequency cutoff unit comprises one or more band-limiting elements in contact with the first antenna unit, and wherein the one or more band-limiting elements have high impedance in the second frequency band and low impedance in the first frequency band,
wherein each of the one or more band-limiting elements comprises one or more beads and a parallel resonance circuit.

14. A portable wireless device according to comprising:
a body;
a first antenna unit that communicates with an external device by way of a first frequency band;
a second antenna unit that is disposed in the vicinity of the first antenna unit and communicates by way of a second frequency band, which is higher than the first frequency band; and
a high-frequency cutoff unit for cutting off high frequency to the first antenna unit such that at least a portion of the first antenna unit becomes a passive element of the second antenna unit, wherein the high-frequency cutoff unit comprises one or more band-limiting elements in contact with the first antenna unit, and wherein the one or more band-limiting elements have high impedance in the second frequency band and low impedance in the first frequency band,
wherein the first antenna unit comprises a plurality of sides and a pattern comprising one or more lines, and wherein the one or more band-limiting elements contact the at least one of the one or more lines on one of the plurality of sides that is different than one of the plurality of sides that is closest to the second antenna unit.

15. The portable wireless device according to claim 14, wherein the pattern comprises a spiral pattern.

16. The portable wireless device according to claim 14, wherein the one or more band-limiting elements contact at least one of the one or more lines on one or more of the plurality of sides that are orthogonal to the side that is closest to the second antenna unit.

17. The portable wireless device according to claim 16, wherein the one or more band-limiting elements contact at least one of the one or more lines on two of the plurality of sides that are orthogonal to the side that is closest to the second antenna unit.

18. The portable wireless device according to claim 1, wherein the at least a portion of the first antenna unit that becomes the passive element of the second antenna unit comprises a region of the first antenna unit that is closest to the second antenna unit.

* * * * *